United States Patent Office 3,458,569
Patented July 29, 1969

3,458,569
PROCESS FOR PRODUCING METHYLPHOS-
PHONODICHLORIDOTHIOATE
Thomas M. Melton, Richmond, Va., assignor to Mobil Oil Corporation, a corporation of New York
No Drawing. Filed Nov. 17, 1966, Ser. No. 594,992
Int. Cl. C07f 9/52
U.S. Cl. 260—543   12 Claims This invention relates to a process for the production of methylphosphonodichloridothioate. More particularly, it relates to a process for producing said chemical utilizing the effluent from the high-temperature synthesis of methylphosphonous dichloride from methane and phosphorus trichloride.

The synthesis of methylphosphonous dichloride from methane and phosphorus trichloride involves passing the two reactants in gaseous form through a tube or other convenient reactor wherein the temperature is maintained at or about 575° C. The average residence time in the reactor is of the order of three to five seconds. It is not possible, under presently known conditions, to effect complete conversion to the desired phosphonous dichloride, and the effluent consists of about 80% unconverted phosphorus trichloride and about 20% of product. Notwithstanding the low yield of methylphosphonous dichloride, this method is a decided advance over other processes for producing it, as for example the reaction between methylmagnesium chloride and phosphorus trichloride.

The main disadvantage of the "hot zone" method of producing methylphosphonous dichloride is that this product is difficult to separate from the unconverted phosphorus trichloride. Although separation can be accomplished by distillation, it is impractical without the use of a highly efficient column. The close proximity of the boiling points of the two components of the effluent mixture (79° C. for $PCl_3$; 81° C. for $CH_3PCl_2$) would require, for their separation, an expensive column containing many theoretical plates.

Methylphosphonous dichloride is a valuable starting material for the manufacture of methylphosphonodichloridothioate, which itself is an intermediate for producing exceptionally active pesticides. The effluent from the "hot zone" reaction between methane and phosphorus trichloride appeared to present a ready and economical source of the starting material for the pesticide intermediate, but only if a method for the easy separation of starting material could be discovered. Once obtained, the desired product can be reacted with alcohols or mercaptans, the products therefrom being used per se or in combination with pesticidal carriers as the active ingredient. S,S-dipropyl methylphosphonotrithioate is an example of such a product.

It is thus an object of this invention to provide a method for obtaining the said pesticide intermediate directly from the effluent mixture. It is a further object to provide a process which will give the pesticide intermediate in high yields and of such purity that it can be used directly for the manufacture of pesticides. Other objects will become apparent from the remainder of the disclosure.

The above and other objects are attained by reacting the methylphosphonous dichloride present in the effluent from the $CH_4$–$PCl_3$ reaction with sulfur, and separating therefrom the methylphosphonodichloridothioate thus formed. As will be seen from the following, this operation is not as simple as it appears, and not obvious from any art known at present.

It is known that both phosphorus trichloride and methylphosphonous dichloride will react with sulfur to form $P(S)Cl_3$ and $CH_3P(S)Cl_2$, respectively. Thus, competing reactions of the two components of the mixture with sulfur result in a mixture of products, with consequent low yields of the desired pesticide intermediate. The process of this invention makes it possible to effect a preferential reaction between the $CH_3PCl_2$ and sulfur, and to eliminate almost completely the competing reaction between $PCl_3$ and sulfur.

The discovery which makes possible the preferential reaction between $CH_3PCl_2$ and sulfur involves the use of a complex prepared from aluminum chloride and the component methylphosphonous dichloride, preferably equimolar quantities thereof. The complex acts upon the system in such a way that the reaction of sulfur proceeds almost exclusively with the $CH_3PCl_2$, even in the presence of substantial amounts of phosphorus trichloride. However, to further ensure minimum reaction of sulfur with phosphorus trichloride, the reaction may be run under conditions in which the trichloride is continuously and substantially removed from the system. Although this does not appear to be essential to the process, it is desirable, and has been embodied in the preferred practice of this invention.

The above broad aspects of the invention can be better understood from the following description of the overall process. It will illustrate, in a generalized way, the nature of the improved process.

An equimolar mixture of aluminum chloride and methylphosphonous trichloride are charged into a reactor and heated to about 100° C. To a mixture of about 80% of phosphorus trichloride and about 20% of methylphosphonous dichloride, obtained from the reaction of methane and phosphorus trichloride as described in J.A.C.S. 84, 851 (1962), sulfur is added in an amount equivalent to the methylphosphonous dichloride present. This three-component mixture is added to the

complex at about 100° C., while removing the $PCl_3$ from the reaction zone by distillation. The product, methylphosphonodichloridothioate, may then be recovered by distillation at 140–150° C. at atmospheric pressure, or it may be removed at a lower temperature under reduced pressure.

It should be noted that the amount of aluminum chloridemethylphosphonous dichloride complex will vary with the size of the reactor, facilities for cooling or heating, and the like. In the specific embodiments which appear hereinafter, the complex filled from ⅙ to ⅓ of the volume of the reactor, but the exact volume will be largely a matter of choice and convenience. So far as is known, the volume is not critical. Once the complex is established in the reactor, it will be unnecessary to repeat the operation, since it is stable and can be used for subsequent runs.

The temperature of reaction shown above, and in the specific embodiments which follow, is not to be considered as exclusive. One consideration in this process is that the temperature be sufficiently above the boiling point of $PCl_3$ to effect removal thereof. Thus, at atmospheric pressure, the reaction may be carried out at temperatures of from about 85° C. to the lowest temperature at which any of the components will decompose. Using the present process, it has been found that the reaction between methylphosphonous dichloride and sulfur proceeds at a rapid rate at from about 90° to about 125° C., preferably at 90° to about 100° C., and that temperatures within this range allow practically instantaneous and substantially complete distillation of the phosphorus trichloride.

The process of this invention is readily adaptable to continuous production of the desired product. Following the high temperature reaction of methane and phosphorus trichloride, the effluent mixture containing the approximate 80-20 mixture of $PCl_3$ and $CH_3PCl_2$, respectively, may be condensed and passed into a reactor containing the $AlCl_3$-$CH_3PCl_2$ complex as already described, along with sulfur, which is added at a rate which will provide an amount thereof equal to the $CH_3PCl_2$ in the effluent mixture.

The reaction involving sulfur is run at the same temperatures mentioned above, i.e., at from about 90° to about 125° C., preferably at from about 90° to about 100° C. During this reaction, phosphorus trichloride can be, if desired, continuously and substantially removed from the reaction zone. After establishing product conditions, $CH_3P(S)Cl_2$ and complex are drawn off from the reactor so that product is removed, at a rate equivalent to the rate at which the $CH_3PCl_2$ reactant is being added to the reactor, and placed in a still, and the $CH_3P(S)Cl_2$ is removed by distillation. Sufficient complex may be drawn off from the still residue or obtained from other sources, to replenish that removed from the reactor, and is continually recycled at a rate approximately equal to that at which it is being withdrawn in the product stream. The distillate, the desired pesticide intermediate, is pumped to another still for redistillation, if desired, or to storage for use in the preparation of useful pesticides.

The following example illustrates the reaction between sulfur and the 80-20 mixture of phosphorus trichloride and methylphosphonous dichloride. In the example, "parts" are by weight.

EXAMPLE

A complex was formed by placing 26.7 parts (0.2 mole) of aluminum chloride and 22.7 parts (0.2 mole) of methylphosphonous dichloride in a reactor and heating to 100° C. under a blanket of nitrogen. A mixture consisting of 22.7 parts of methylphosphonous dichloride, 6.4 parts (0.2 mole) of sulfur and 100 parts (0.728 mole) of phosphorus trichloride were added to the complex at 100° C. over a period of 20 minutes, while stirring and while removing phosphorus trichloride. The methylphosphonodichloridothioate was removed from the complex at the various temperatures and pressures shown in the table below, and was then redistilled at from 125°– 152° C. (mostly 140–152° C.) at atmospheric pressure after each run. The yields shown in the table represent the amounts obtained upon redistillation.

After completing each run, without removing or adding additional complex, the next run was begun by adding the three component mixture, and completed as above specified. Since the runs were made in this way, the yields shown are cumulative, and the various runs show how the process can be expected to function in a continuous operation.

I claim:

1. In a process for producing the compound methylphosphonodichloridothioate from sulfur and the effluent mixture from the high temperature reaction of methane and phosphorus trichloride, said mixture containing about 80% phosphorus trichloride and about 20% methylphosphonous dichloride, the improvement which comprises carrying out said process in the presence of a complex formed from aluminum chloride and methylphosphonous dichloride, whereby the reaction of sulfur with the major component of said mixture occurs to a negligible extent.

2. The process of claim 1 in which the reaction in the presence of the said complex is carried out at a temperature between about 85° C. and the lowest temperature at which any of the components will decompose.

3. The process of claim 2 in which the temperature of reaction is from about 90° to about 125° C.

4. The process of claim 2 in which the temperature of reaction is from about 90° to about 100° C.

5. The process of claim 1 in which said complex is formed from equimolar quantities of aluminum chloride and methylphosphonous dichloride.

6. The process of claim 1 in which the phosphorus trichloride is continuously and substantially removed from the reaction zone.

7. A continuous process for producing the compound methylphosphonodichloridothioate which comprises the steps of reacting methane and phosphorus trichloride at high temperatures thereby obtaining a mixture containing about 80% of phosphorus trichloride and about 20% of methylphosphonous dichloride, adding said mixture and sulfur to a complex formed from aluminum chloride and methylphosphonous dichloride, establishing product condititons and withdrawing said compound and complex at about the same rate as reactants are being replenished to the reactor.

8. The process of claim 7 in which the reaction in the presence of said complex is carried out at temperatures within the range of about 90° to about 125° C.

9. The process of claim 8 in which the temperature of reaction is from about 90° to about 100° C.

10. The process of claim 7 in which said complex is formed from equimolar quantities of aluminum chloride and methylphosphonous dichloride.

11. The process of claim 7 in which the phosphorus trichloride is continuously and substantially removed from the reaction zone.

TABLE

| Run | Strip $CH_3P(S)Cl_2$ Press, mm. Hg. | Strip $CH_3P(S)Cl_2$ Pot temp., °C. | Wt. obtained, redistillation | Cumulative weight | Theoretical weight, gn. | Cumulative reaction time, hr. | Cumulative, percent recovery |
|---|---|---|---|---|---|---|---|
| 1 | 200 | 120 | 9.4 | 9.4 | 29.8 | 1/3 | 31.5 |
| 2 | 200 | 120 | 3.9 | 13.3 | 59.6 | 2/3 | 22.3 |
| 3 | 45 | 100 | 40.8 | 54.1 | 89.4 | 1 | 61.4 |
| 4 | 45 | 125 | 22.3 | 76.4 | 119.2 | 1¼ | 63.8 |
| 5 | 50-60 | 125 | 10.0 | 86.4 | 149.0 | 1⅜ | 57.9 |
| 6 | 45 | 125 | 65.9 | 152.3 | 178.8 | 2 | 85.7 |
| 7 | 45 | 125 | 30.9 | 183.2 | 208.6 | 2¼ | 87.8 |
| 8 | 45 | 125 | 32.4 | 215.6 | 238.4 | 2⅔ | 90.2 |
| 9 | 45 | 125 | 29.6 | 245.2 | 268.2 | 3 | 91.3 |
| 10 | 45 | 125 | 26.5 | 271.7 | 298.0 | 3⅓ | 91.0 |

12. The process of claim 7 in which the complex is continually recycled at a rate approximately equal to that at which it is being withdrawn in the product stream.

References Cited

Pianfetti, J. A., et al., J. Am. Chem. Soc., vol. 84, pp. 851–854 (1964).

Houben-Weyl, Methoden der Organischen Chemie, vol. 12/1, pp. 552–557 (particularly pp. 553–554) (1963).

LORRAINE A. WEINBERGER, Primary Examiner

H. C. WEGNER, Assistant Examiner